Sept. 1, 1925.
S. A. CRONE
1,552,046
EMERGENCY SAFETY SUPPORT FOR BRAKE BEAMS
Filed Sept. 6, 1924 2 Sheets-Sheet 1
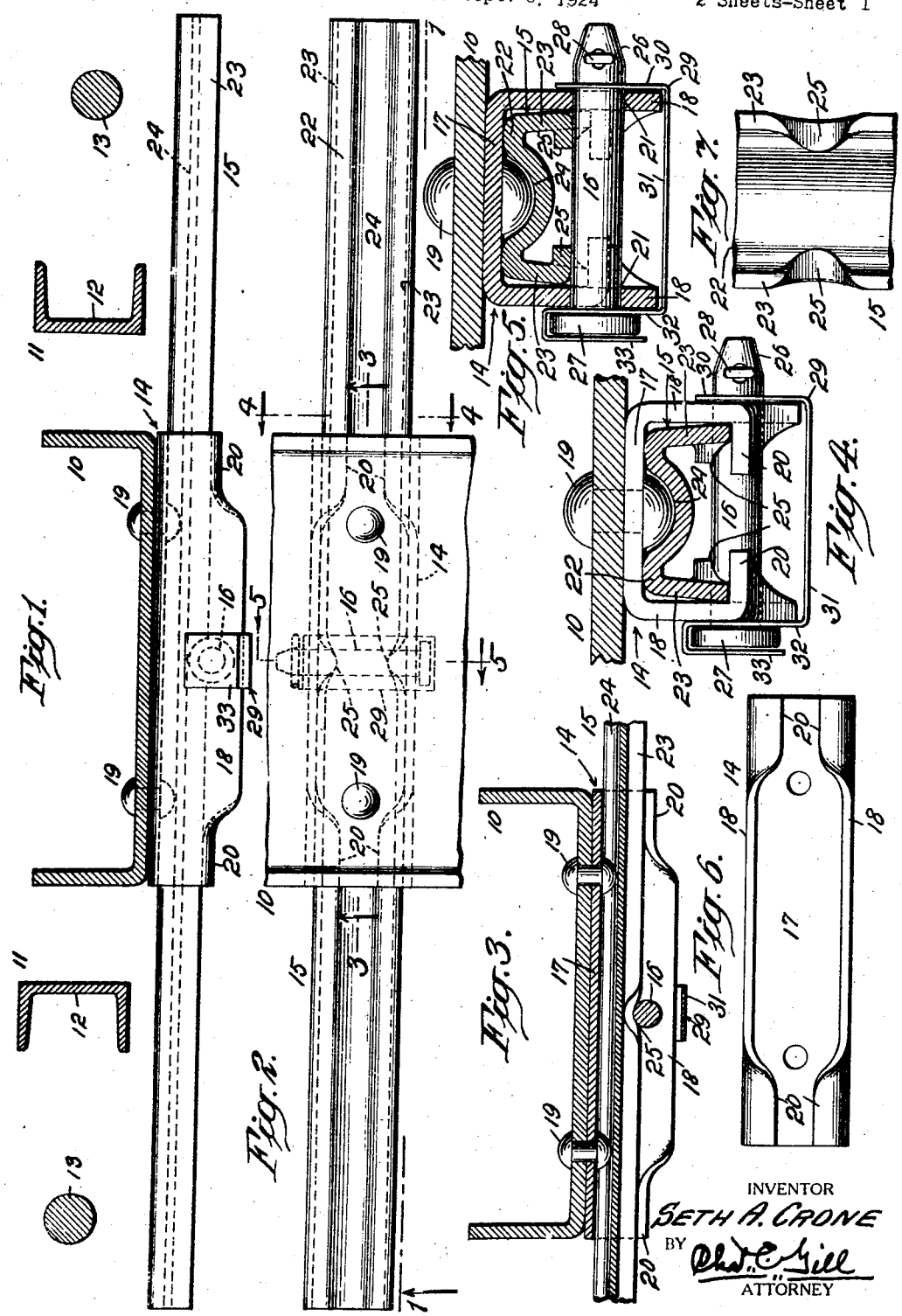

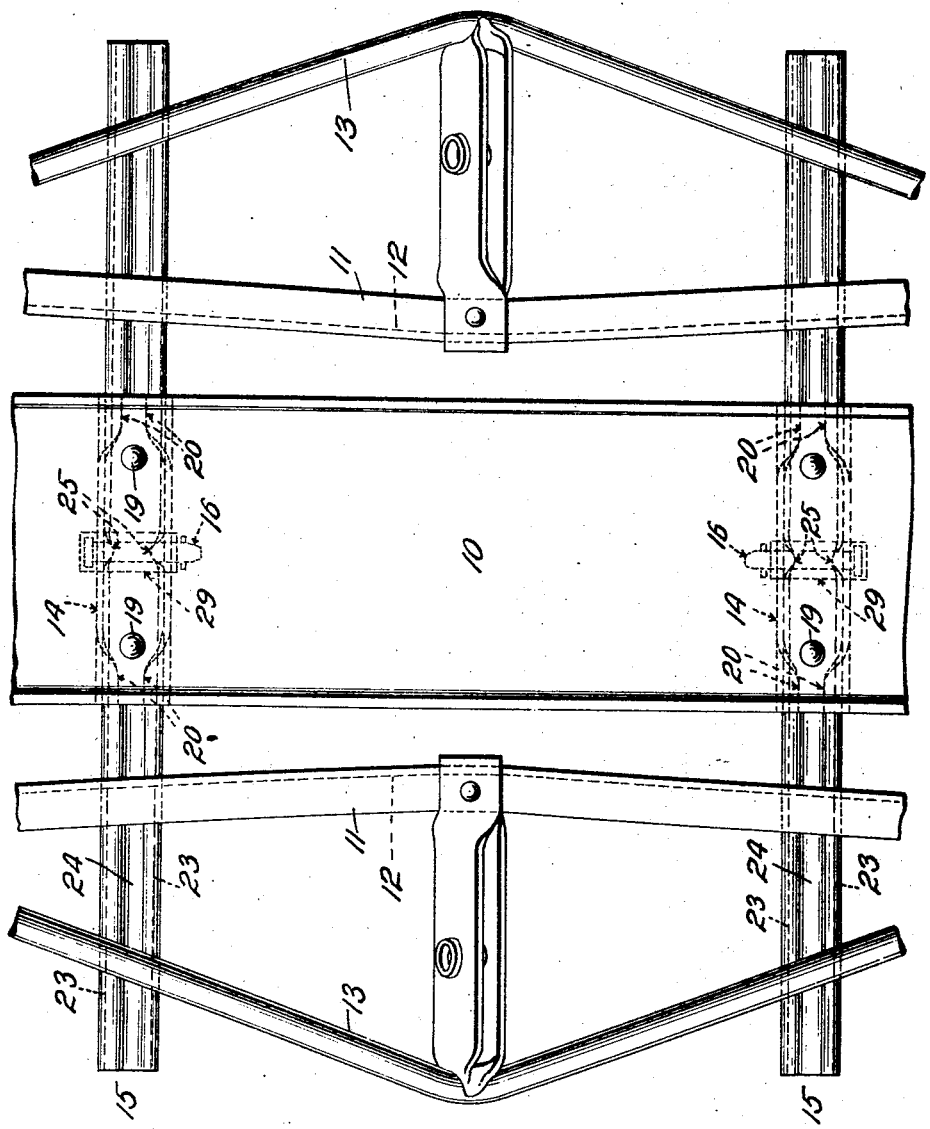

Patented Sept. 1, 1925.

1,552,046

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

EMERGENCY SAFETY SUPPORT FOR BRAKE BEAMS.

Application filed September 6, 1924. Serial No. 736,202.

*To all whom it may concern:*

Be it known that I, SETH A. CRONE, a citizen of the United States, and a resident of East Orange, in the county of Essex and State of New Jersey, have invented certain new and useful Improvements in Emergency Safety Supports for Brake Beams, of which the following is a specification.

The invention pertains to railway brake beams and particularly to novel auxiliary or emergency supporting bars extending below and to receive the brake beams in the event that said beams should become detached from their hangings, one purpose of the invention being to prevent, in case of accident, the brake beams from falling to the roadbed, derailment being thereby avoided.

A further and important part of the invention resides in the special means I have provided for securing the auxiliary or emergency bars to the bottom of the spring plank, these means being adapted to very firmly clamp and support the auxiliary emergency bars and also, when necessary, to permit the convenient removal of said bars, such removal, in a speedy and convenient manner, being desirable in the event that it should be necessary to unhang a brake for repair purposes.

A further purpose of the invention is to provide means for securing the emergency bars in a very durable and in an economical manner, reducing the manufacturing and labor costs to a minimum, while at the same time providing means of extreme durability for receiving and maintaining the emergency or safety bars.

My invention also provides a safety bar of great strength without excess of weight therein.

The invention will be fully understood from the detailed description hereinafter presented, reference being had to the accompanying drawings, in which, Fig. 1 is a vertical longitudinal section through a portion of a car truck equipped with the features of my invention, the section being on the dotted line 1—1 of Fig. 2;

Fig. 2 is a top view, partly broken away, of the same;

Fig. 3 is a vertical longitudinal section through the same taken on the dotted line 3—3 of Fig. 2;

Fig. 4 is a vertical transverse section through the same taken on the dotted line 4—4 of Fig. 2;

Fig. 5 is a vertical transverse section through the same taken on the dotted line 5—5 of Fig. 2;

Fig. 6 is a bottom plan view of the bracket which I secure to the spring plank for receiving and supporting the emergency or safety bar;

Fig. 7 is a bottom plan view of the central portion only of the emergency or safety bar, this figure being presented to illustrate the flanging inwardly of the side members of said bar to form seats for the transverse securing pin, by which the bar becomes locked within the bracket or support shown in Fig. 6, and Fig. 8 is a top view, partly broken away, of a car truck showing the auxiliary or emergency supporting bars positioned below the end portions of the brake beams, at each side of the truck.

In the drawings 10 designates a conventional form of spring plank and 11 portions of inside hung trussed brake beams of usual character comprising compression members 12 and tension members or truss rods 13.

The invention pertains to the bracket 14, emergency or safety bar 15, and locking pin 16, these features being duplicated at the opposite sides of the truck, as shown in Fig. 8, so that the emergency or safety bars may extend below both end portions of the brake beams.

The bracket 14 is formed from wrought metal and of channel form, and said bracket comprises a top member 17 and depending side members or flanges 18, which are of sufficient depth to receive between them the emergency or safety bar 15. The bracket 14 is riveted to the spring plank 10 by means of rivets 19 which extend through the spring plank and the top member 17 of the bracket 14 and are headed on their upper and lower ends, as shown. The bracket 14 has the front and rear end portions of its side members 18 flanged inwardly toward each other, as at 20, to form supports for the emergency or safety bar 15, and the side members or flanges 18 of the bracket 14 are formed with transverse openings 21 to receive the pin 16, by which the emergency or safety bar 15 is secured in stationary position within the channel of the bracket 14. The bracket 14 extends longitudinally of the car truck and in length is about equal to the width of the spring plank 10, and each car truck will be provided adjacent to each end of the spring plank 10 with a supporting bracket 14, provision being thereby made for two emergency or safety bars 15, one being located adjacent to each side of the car truck and below the end portions of the brake beams. The bracket 14 being of wrought metal and formed of channel form, and having the end inturned flanges 20, is of extreme durability and easy of manufacture.

The emergency or safety bar 15 is in one continuous piece and is of channel-form, comprising a top member 22 and depending side members or flanges 23. The top member 22 of the emergency or safety bar 15 is formed throughout its length with a concave groove 24, which is adapted to receive and be slid along the lower heads of the rivets 19. The side flanges 23 of the bar 15 are plain throughout except at the transverse central portion of the bar, whereat said side members 23 are flanged inwardly, as at 25, to form concave recesses to receive the upper side of the securing pin 16 and also broad bearing surfaces to engage said upper surface of the pin 16. The bar 15 at its opposite sides extends from the end flanges 20 to the lower surface of the top member 17 of the bracket 14, as shown in Fig. 4, and hence said bar becomes snugly positioned within the bracket 14 and is supported at each end of the bracket by the flanges 20.

After the bracket 14 has been riveted to the spring plank, only two rivets being required for each bracket, said bracket is left permanently in position. The safety or emergency bar 15 is slid endwise into the bracket 14 until its transverse central portion is at the transverse central portion of the said bracket, and when the bar 15 has attained this position, the recesses formed therein by the flanges 25 will be in line with the upper portions of the openings 21 formed in the side members or flanges 18 of the bracket, and thereupon the pin 16 will be driven through the apertures 21 and against the seats formed by the flanges 25 of the bar 15, or to the position shown in Figs. 4 and 5, in which position the pin 16 becomes interlocked with the bar 15 and prevents endwise movement of said bar. The pin 16 also aids in firmly securing the bar 15 within the bracket and to prevent any rattling movement of said bar. The pin 16 is tapered at one end, as at 26, to facilitate the positioning of the pin and particularly to enable the forward end of the pin to find and pass through the aperture 21 in the inner side flange or member 18 of the bracket 14. The pin 16 has a head 27 on one end and at its other end will be equipped with a cotter key 28. I preferably apply to the pin 16 a lock 29 for securing the pin against displacement in the event that the cotter key 28 should become broken or lost. The lock 29 is formed from one integral piece or strip of sheet metal and comprises an inner end member 30 which is apertured to allow the pin 16 to pass through it, a base member 31 which extends below the bracket 14 and from one side to the other thereof, a vertical member 32 which is positioned against the outer side flange 18 of the bracket and apertured to permit the pin 16 to pass through it, and an extension member 33 which projects from the upper end of the member 32 and is bent downwardly against the outer face of the head 27 of the pin 16. The lock 29 by reason of its construction and mounting and by the engagement of its extension portion 33 against the outer face of the head 27 of the pin 16, will retain the pin in place even though the cotter key 28 may become lost or broken.

When, for any reason, it should be desired to remove the emergency or safety bar 15, or slide the same, without complete removal, endwise from below one or the other of the brake beams 11, the extension member 33 of the lock 29 will be bent upwardly and outwardly from the head of the pin 16, and thereupon the cotter key 28 will be removed and the pin 16 withdrawn from the bracket 14, thus leaving the bar 15 free to be slid endwise along the bracket 14 either forwardly or rearwardly and to any extent desired, said bar, if not entirely removed from the bracket, being in any of its positions supported by the inturned flanges 20 of the bracket.

The features of my invention thus comprise the wrought metal bracket 14, wrought metal bar 15, and a pin 16, and the bracket 14 becomes efficiently secured to the spring plank by only two rivets 19, whose lower heads cooperate with the features of the bracket in guiding the bar 15 into and from the bracket. My invention, therefore, comprises only a few easily manufactured and installed parts of very durable character.

I do not limit my invention to all of the details of form and construction hereinbefore specifically described in presenting the preferred embodiment of my invention, since I am aware that some of these details may be modified within the spirit of my invention and the scope of the appended claims.

What I claim as my invention and desire to secure by Letters Patent, is:

1. In a car-truck having a spring plank and inside hung brake-beams, an auxiliary or emergency safety-bar extending longitudinally below and normally free of the beams, and means removably supporting said bar from the spring plank, comprising a bracket having a top member secured to the spring plank and depending side members, portions of which are flanged inwardly to provide supports for said safety bar, and a transverse pin extending through said side members and engaging said bar for locking the same against endwise movement.

2. In a car-truck having a spring plank and inside hung brake-beams, an auxiliary or emergency safety bar extending longitudinally below and normally free of the beams, and means removably supporting said bar from the spring plank, comprising an inverted channel bracket secured to the spring plank and having end portions of its depending side members flanged inwardly to provide supports for said safety bar, and a transverse pin extending through said side members and engaging said bar for locking the same against endwise movement.

3. In a car-truck having a spring plank and inside hung brake-beams, an auxiliary or emergency safety bar extending longitudinally below and normally free of the beams and being of inverted channel shape in cross-section, an inverted channel bracket secured to the spring plank and having portions of its side members flanged inwardly to provide supports for said safety bar and a transverse pin extending through said side members and engaging said bar for locking the same against endwise movement.

4. In a car-truck having a spring plank and inside hung brake-beams, an auxiliary or emergency safety bar extending longitudinally below and normally free of the beams and being of inverted channel shape in cross-section, an inverted channel bracket secured to the spring plank and having portions of its side members flanged inwardly to provide supports for said safety bar and a transverse pin extending through said side members and engaging said bar for locking the same against endwise movement, said safety bar having portions of its side members transversely recessed to interlock with said pin.

5. In a car-truck having a spring plank and inside hung brake-beams, an auxiliary or emergency safety bar extending longitudinally below and normally free of the beams and being of inverted channel bracket in cross-section, an inverted channel bracket secured to the spring plank and having portions of its side members flanged inwardly to provide supports for said safety bar and a transverse pin extending through said side members and engaging said bar for locking the same against endwise movement, said bracket being secured to the spring plank by rivets extending through said plank and the top member of said bracket and headed on their lower ends, and said safety bar being longitudinally depressed along its top member to slide along said rivets.

6. In a car-truck having a spring plank and inside hung brake beams, an auxiliary or emergency safety bar extending longitudinally below and normally free of the beams and being of inverted channel shape in cross-section, an inverted channel bracket secured to the spring plank and having end portions of its depending side members flanged inwardly to provide supports for said safety bar and said side members being at their transverse central portions formed with registering apertures, and a transverse pin extending through said apertures below the transverse central portion of said bar for locking the same against endwise movement, the side members of said safety bar being recessed to interlock with said pin.

7. In a car-truck having a spring plank and inside hung brake-beams, an auxiliary or emergency safety bar extending longitudinally below and normally free of the beams and being of inverted channel shape in cross-section and longitudinally depressed in its top member, means removably supporting said bar below the spring plank comprising a channeled bracket secured to the spring plank and adapted to snugly receive said bar, and a transverse pin extending through said bracket and engaging said bar.

8. In a car-truck having a spring plank and an inside hung trussed brake beam, auxiliary or emergency safety bars extending longitudinally below and normally free of the end portions of the beam, and means removably supporting said bars from the spring plank, comprising brackets having top members secured to the spring plank and depending side members, portions of which are flanged inwardly to provide supports for said safety bars, and transverse pins extending through said side members below and engaging said bars for locking said bars against endwise movement.

9. In a car-truck having a spring plank and an inside hung trussed brake beam, auxiliary or emergency safety bars extending longitudinally below and normally free of the end portions of the beam, and means removably supporting said bars from the spring plank, comprising brackets having top members secured to the spring plank and depending side members, portions of which are flanged inwardly to provide supports for said safety bars, and transverse pins extending through said side members below and engaging said bars for locking said bars against endwise movement, said bars being of inverted channel form and having edge portions of their side members transversely recessed to interlock with said pins.

10. In a car-truck having a spring plank and an inside hung trussed brake beam, auxiliary or emergency safety bars extending longitudinally below and normally free of the end portions of the beam, and means removably supporting said bars from the spring plank, comprising inverted channel shaped brackets riveted to said spring plank and having portions of their side members flanged inwardly to afford supports for said safety bars, and transverse pins extending through the side members of said brackets below and engaging said bars for locking said bars against endwise movement, said bars being of inverted channel shape and having their tops depressed to form longitudinal grooves and the edge portions of their side members transversely recessed to interlock with said pins.

11. In a car-truck having an inside hung brake-beam, auxiliary bars extending longitudinally below the end portions of said beam, and means removably supporting said bars from the spring plank, comprising brackets having depending longitudinal side members which are parallel with each other and suspended from the spring plank and adapted to receive between them said bars, said side members having transverse aligned holes formed therein, and transverse clamping pins driven through said holes and against transverse surfaces of said bars with wedging effect, said pins being tapered at one end and having a head on the other end.

12. In a car-truck having an inside hung brake-beam, auxiliary bars extending longitudinally below the end portions of said beam, and means removably supporting said bars from the spring plank, comprising brackets having depending longitudinal side members which are parallel with each other and suspended from the spring plank and adapted to receive between them said bars, said side members having transverse aligned holes formed therein, and transverse clamping pins driven through said holes and against transverse surfaces of said bars with wedging effect, said pins being tapered at one end and having a head on the other end, and said bars being transversely recessed where they are engaged by said pins for interlocking therewith.

Signed at New York city, in the county of New York and State of New York, this 4th day of September A. D. 1924.

SETH A. CRONE.